(12) United States Patent
Davis

(10) Patent No.: US 11,221,056 B2
(45) Date of Patent: Jan. 11, 2022

(54) CONNECTING DEVICE

(71) Applicant: GRIPPLE LIMITED, Sheffield (GB)

(72) Inventor: Simon Davis, Sheffield (GB)

(73) Assignee: GRIPPLE LIMITED

( * ) Notice: Subject to any disclaimer, the term of this patent is extended or adjusted under 35 U.S.C. 154(b) by 0 days.

(21) Appl. No.: 17/258,052

(22) PCT Filed: Jul. 17, 2019

(86) PCT No.: PCT/GB2019/000102
§ 371 (c)(1),
(2) Date: Jan. 5, 2021

(87) PCT Pub. No.: WO2020/039153
PCT Pub. Date: Feb. 27, 2020

(65) Prior Publication Data
US 2021/0285515 A1     Sep. 16, 2021

(30) Foreign Application Priority Data

Aug. 24, 2018 (GB) .................................... 1813867
May 13, 2019 (GB) .................................... 1906724
Jul. 16, 2019 (GB) .................................... 1910146

(51) Int. Cl.
*F16G 11/06* (2006.01)

(52) U.S. Cl.
CPC .................................. *F16G 11/06* (2013.01)

(58) Field of Classification Search
CPC .... F16G 11/105; F16G 11/106; F16G 11/108; F16G 11/06; F16B 2/14; F16B 2/16; F16B 2/18; F16B 7/0493; F16B 7/0486; Y10T 24/3449
See application file for complete search history.

(56) References Cited

U.S. PATENT DOCUMENTS

| 4,736,855 | A | * | 4/1988 | Arakawa | A47B 43/006 108/149 |
| 4,828,210 | A | * | 5/1989 | Anderson | A01K 1/04 119/797 |
| 2003/0160137 | A1 | | 8/2003 | Shuey | |
| 2007/0011851 | A1 | | 1/2007 | Wang | |
| 2010/0038611 | A1 | * | 2/2010 | Lambourn | E04H 17/266 256/53 |
| 2016/0029575 | A1 | | 2/2016 | Marke | |

FOREIGN PATENT DOCUMENTS

| CN | 204907336 U | 12/2015 |
| GB | 2412284 A | 9/2005 |
| GB | 2446501 A | 8/2008 |
| GB | 2535605 A | 8/2016 |
| GB | 2561979 A | 10/2018 |
| WO | 2010/012989 A1 | 2/2010 |
| WO | 2013/159756 A1 | 10/2013 |

* cited by examiner

*Primary Examiner* — Robert Sandy
(74) *Attorney, Agent, or Firm* — Clark Hill PLC; James R. Foley

(57) ABSTRACT

A connecting device (10) comprises a first securing arrangement (16) for securing a first elongate article (12) to the connecting device (10). The first elongate article (12) is secured in a first orientation. The connecting device (10) comprises a second securing arrangement (18) for securing a second elongate article (14) to the connecting device (10). The second elongate article (14) is secured in a second orientation. The second orientation is transverse to the first orientation.

11 Claims, 12 Drawing Sheets

CONNECTING DEVICE

This invention relates to connecting devices. More particularly, but not exclusively, this invention relates to connecting devices for connecting flexible elongate articles in a transverse or cross relationship to one another. This invention also relates to methods of using connecting devices.

The growing of various agricultural produce, for example fruit trees, such as vine, involve arranging the trees in rows, around which wires are arranged. Some of the wires are disposed around or between the rows to support the trees, whereas others are arranged over the rows to support netting covers. Some of the wires or cables extend cross wise, or transverse, to one another. It is often necessary to join these wires or cables. Such joining can be carried out by twisting short lengths of wire around the two cross wires.

According to a general aspect of this invention, there is provided a connecting device comprising a first securing arrangement for securing a first elongate article thereto, and a second securing arrangement for securing a second elongate article to the connecting device.

According to one aspect of this invention, there is provided a connecting device comprising: a first securing arrangement for securing a first elongate article to the connecting device in a first orientation of the first elongate article; and a second securing arrangement for securing a second elongate article to the connecting device in a second orientation of the second elongate article; wherein the second orientation is transverse to the first orientation.

According to another aspect of this invention, there is provided a method of using a connecting device as described in the immediately preceding paragraph, said method comprising securing the first elongate article to the connecting device by means of the first securing arrangement, securing the second elongate article to the connecting device by means of the second securing arrangement.

The second securing arrangement may comprise a hook formation, which may be configured to extend around the second elongate article.

According to another aspect of this invention, there is provided a connecting device comprising a first securing arrangement for securing a first elongate article, and a second securing arrangement for securing a second elongate article, wherein the second securing arrangement comprises a hook formation configured to extend around the second elongate article.

According to another aspect of this invention, there is provided a method of using a connecting device as described in the immediately preceding paragraph, said method comprising securing the first elongate article to the connecting device by means of the first securing arrangement, arranging the second elongate in the hook formation, and securing the second elongate article to the connecting device by means of the second securing arrangement.

The word "transverse" as used herein is intended to refer to one feature extending across another feature, or crosswise relative to another feature. In the embodiment described herein, the first elongate article extends crosswise to the second elongate article. For example, the first elongate article extends at 90° to the second elongate article.

The first and second elongate articles may be first, and second flexible elongate articles, such as wires, cables, wire ropes, tapes or the like.

In one embodiment, at least one of the first and second elongate articles may be a rigid elongate article, such as rebar. Desirably, the second elongate article is the rigid elongate article.

The first securing arrangement may comprise a first clamping arrangement. The second securing arrangement may comprise a second clamping arrangement.

The step of securing the first elongate article to the first securing arrangement may comprise clamping the first elongate article by means of the first clamping arrangement.

The step of securing the second elongate article to the second securing arrangement may comprise clamping the second elongate article by means of the second clamping arrangement.

The connecting device may comprise a body which may carry the first and second securing arrangements. The body may include a housing to house the first securing arrangement. The body may have a forward region and a rearward region.

A nose formation may extend from the body. The nose formation may extend from the forward region of the body. The nose formation may comprise a pair of projections. The projections may be parallel to each other. A gap may be defined by the nose formation. The gap may be defined between the projections.

The gap may receive an end region of the first elongate article. The first elongate article may be bent into the gap. In the embodiment described herein, the bending of the end region of the elongate article into the gap provides the advantage that it helps prevent the first elongate article catching on netting as it is installed or during use.

The nose formation may be configured to interact with a tensioning tool to allow the tensioning tool to tension the first elongate article within the first clamping arrangement. The nose formation may include narrowed forward end portions to interact with the tensioning tool.

The first clamping arrangement may comprise a passage for the first elongate article. The passage may be defined by the body. The passage may be within the housing. The first elongate article may extend through the passage.

The step of securing the first elongate article may comprise arranging the first elongate article within the passage.

The first clamping arrangement may include a clamping member for clamping the first elongate article in the passage. The first clamping arrangement may include an urging member for urging the clamping member towards the passage.

The body may define an internal space in which the urging member is disposed. The internal space may communicate with the passage to allow the urging member to urge the clamping member towards the passage.

The urging member may be arranged between the passage and the second securing arrangement. Alternatively, the passage may be arranged between the urging member and the second securing arrangement.

The urging member may urge the clamping member away from the forward region of the body. The urging member may urge the clamping member away from the nose formation.

The urging member may comprise a spring, such as a coil spring. The urging member may comprise a compression spring. The compression spring may have an inwardly tapering end. The compression spring may have inwardly tapering opposite ends. The, or each, end of the compression spring may have a frustoconical configuration.

The step of securing the first elongate article to the first securing arrangement may comprise moving the first elongate article through the passage to move the clamping member away from the passage.

The step of securing the first elongate article to the first securing arrangement method may thereafter comprise moving the first elongate article in the opposite direction to cause the clamping member to clamp the first elongate article.

The first clamping arrangement may include a clamping surface for engaging the first elongate article. The clamping surface may be an internal surface of the body. The clamping member may clamp the first elongate article against the clamping surface.

The first clamping arrangement may further include a reaction surface to provide a reaction force on the clamping member when the clamping member clamps the first elongate article against the clamping surface.

The reaction surface may be an internal surface of the body. The reaction surface may be opposite the clamping surface. The reaction surface may be a surface defining the internal space.

The step of clamping the first elongate article may comprise arranging the first elongate article and the clamping member between the clamping surface and the reaction surface. Thus, in one embodiment, the clamping force is applied to the first elongate article from the clamping surface and the clamping member and from the reaction surface.

The clamping surface and the reaction surface may taper towards each other. The clamping surface and the reaction surface may taper towards each other in a direction away from the receiving arrangement. The urging member may urge the clamping member in a direction away from the receiving arrangement.

The features of the first securing arrangement of the embodiment described herein provide the advantage that when the connecting device is in use, tension on the first elongate article has a tendency to pull the clamping member into greater clamping engagement with the first elongate article, thereby preventing the first elongate article from being inadvertently released from the first securing arrangement.

The clamping member may be a wedge, a roller or a ball. The roller may be a substantially cylindrical roller.

The second clamping arrangement may comprise a receiving arrangement for receiving the second elongate article. In one embodiment, the receiving arrangement may be provided on the body. The receiving arrangement may be integrally attached to the body.

The step of securing the second elongate article to the second securing arrangement may comprise arranging the second elongate article in the receiving arrangement.

The receiving arrangement may comprise the hook formation, which may be configured to extend around the second elongate article. The step of securing the second elongate article to the second securing arrangement may comprise arranging the second elongate article in the hook formation.

The receiving arrangement may be provided at the forward region of the body. The receiving arrangement may extend from the nose formation.

The hook formation may extend across the body. The hook formation may comprise a pair of hook members arranged side by side. Each hook member may extend from a respective one of the projections. Each of the hook members may have an opening facing in the same direction relative to the body. The opening of each hook member may face the rearward region of the body.

A web portion may extend between the hook members. Thus, the hook members are joined to each other by the web portion. Alternatively, the hook members may be arranged alongside each other, and may extend contiguously adjacent each other. Alternatively, the hook formation may comprise a single hook member extending across both projections. The opening of the single hook member may face the rearward region of the body.

The step of securing the second elongate article to the second securing arrangement may comprise arranging the second elongate article to extend across the hook members.

Alternatively, the hook formation may comprise a single hook member, which may extend across the body.

The second securing arrangement may comprise a movable member. The second clamping arrangement may comprise the movable member. The movable member may include a clamping portion for clamping the second elongate article.

The step of securing the second elongate article to the second securing arrangement may comprise moving the movable member to clamp the second elongate article with the clamping portion.

The step of securing the first elongate article to the first securing arrangement may comprise holding the first elongate article under tension when the second elongate article is secured to the second securing arrangement. The step of securing the first elongate article to the first securing arrangement may comprise holding the first elongate article under tension when the second elongate article is clamped by the movable member to the hook formation. The second elongate article may be selected from a plurality of second elongate articles having different widths or diameters.

The movable member may include a cooperating portion to effect movement of the movable member and thereby effect clamping of the second elongate article. The cooperating portion may allow movable member to be moved into clamping engagement with the second elongate article.

The body may include cooperating formations to cooperate with the cooperating portion of the movable member, thereby effecting the aforesaid movement of the movable member. The second clamping arrangement may include a holder on the body to hold the movable member. The holder may include the cooperating formations.

The movable member may include the clamping portion. The cooperating portion may be a threaded portion. The formations on the body may be corresponding threads. The threaded portion may cooperate with the corresponding threads on the body. The movable member may comprise a bolt.

Alternatively, the second securing arrangement may include a discrete fastening member held by the body. The fastening member may comprise cooperating formations to cooperate with the cooperating portion to effect the aforesaid movement. The holder may hold the fastening member. The cooperating formations may comprise corresponding threads.

The fastening member may receive the movable member therethrough. Thus, when the movable member is received by the fastening member, the movable member is held by the holder. The fastening member may be a captive fastening member. The fastening member may comprise a nut.

The step of securing the second elongate article to the second securing arrangement may comprise screwing the movable member through the cooperating portion to clamp the second elongate article with the clamping portion.

The movable member may have a proximal end region. The proximal end region may comprise a drive formation to allow driving of the movable member. The drive formation may comprise a head of the movable member, which may be configured to cooperate with a driving tool, such as a screwdriver, spanner or hex key.

The movable member may have a distal end region. The distal end region may be the clamping portion.

The movable member may clamp the second elongate article against the receiving arrangement to secure the second elongate article to the second securing arrangement. Thus, the movable member may clamp the second elongate article to the body.

The step of securing the second elongate article to the second securing arrangement may comprise screwing the movable member through the cooperating portion so that the distal end of the movable member clamps the second elongate article.

At least one embodiment of the invention will now be described by way of example only, with reference to the accompanying drawings, in which.

Figure 1:
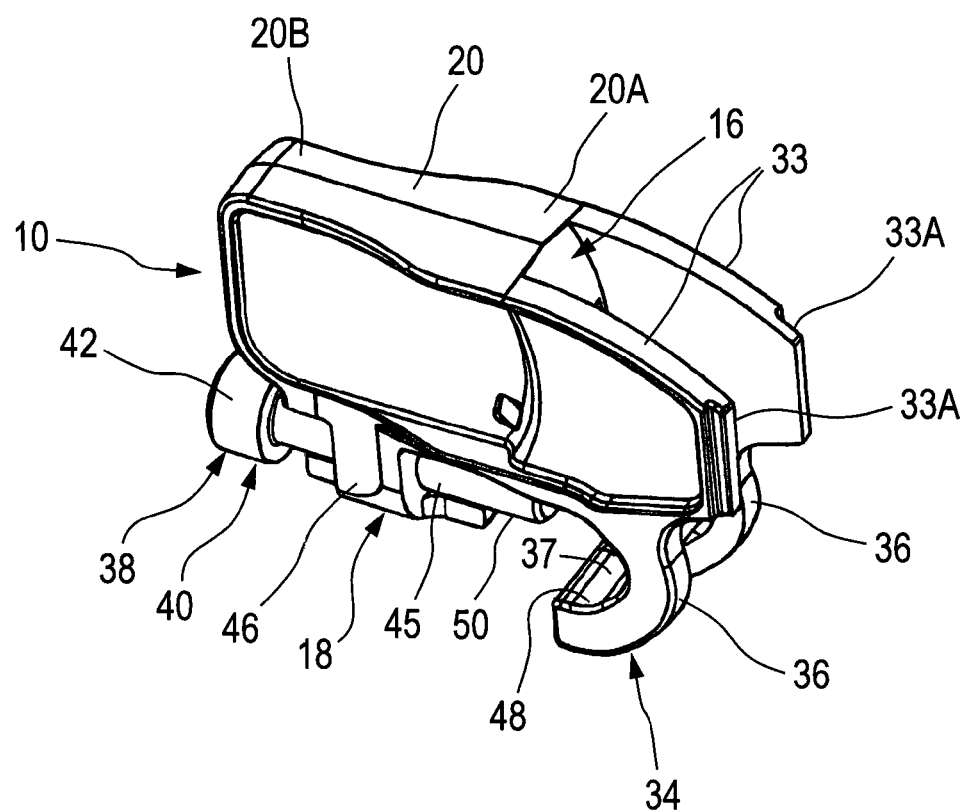
FIG. 1 is a perspective view from above of a connecting device.
Figure 2:
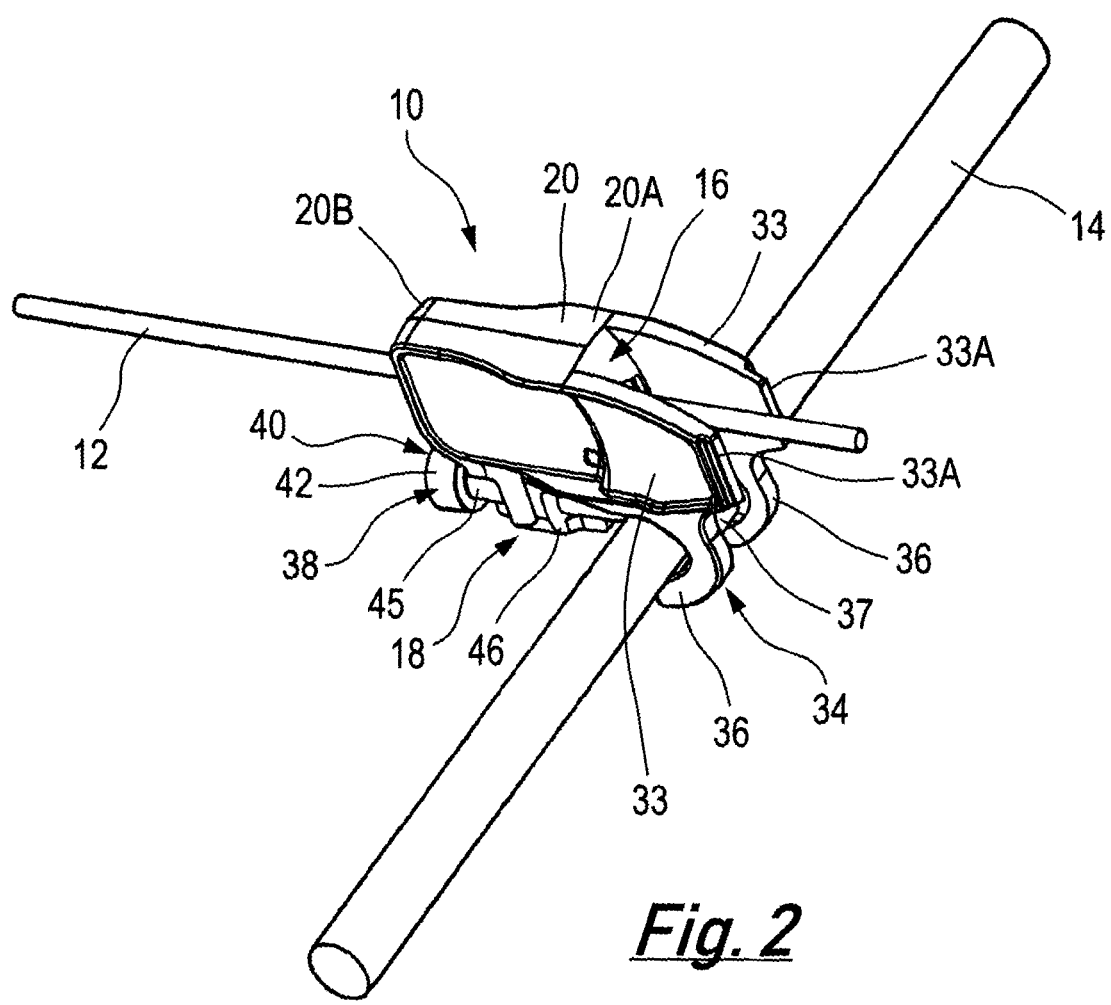
FIG. 2 is a perspective view from above of the connecting device with first and second elongate articles secured thereto.
Figure 3:
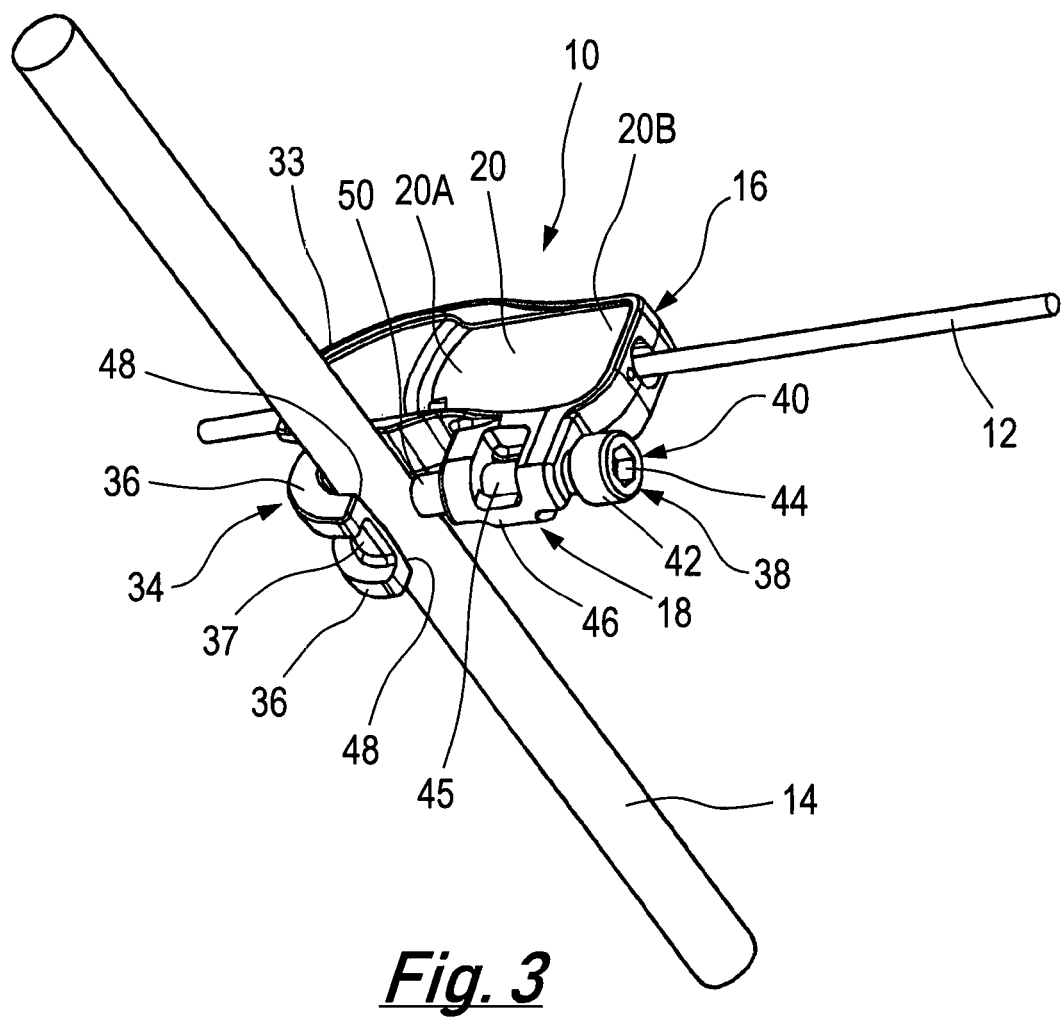
FIG. 3 is a perspective view from below of the connecting device with the first and second elongate articles secured thereto.
Figure 4:
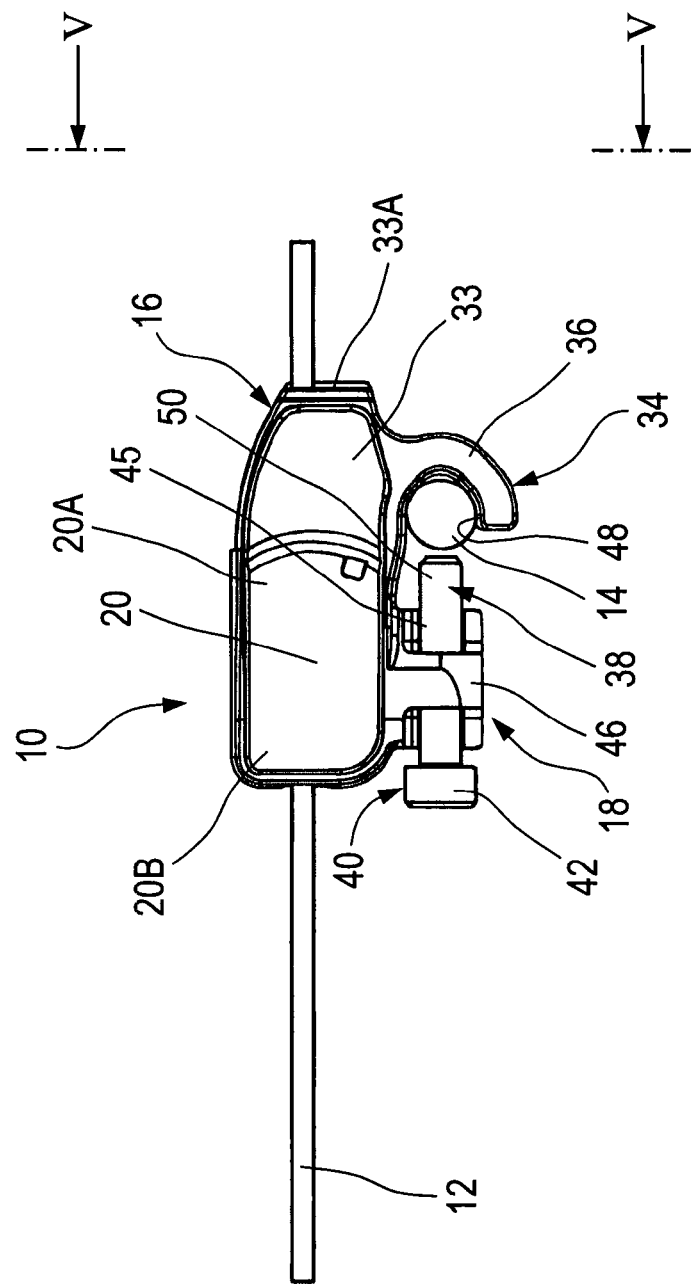
FIG. 4 is a side view of the connecting device with the first and second elongate articles secured thereto.
Figure 5:
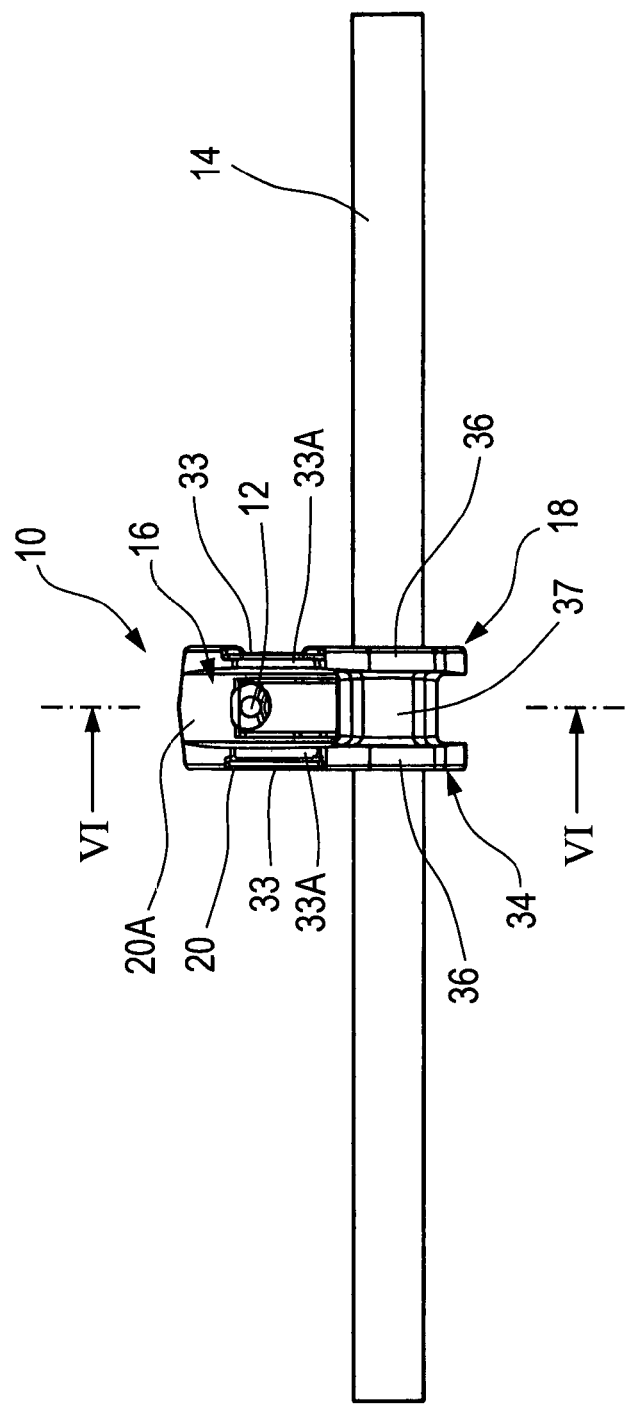
FIG. 5 is a view along the lines V-V in FIG. 4.

The drawings show a connecting device 10 for connecting a flexible first elongate article 12, in the form of a first wire, cable, wire rope, tape or the like, transverse to a second elongate article 14. The second elongate article 14 may be a flexible elongate article in the form of a second wire, cable, wire rope, tape or the like. Alternatively, the second elongate article 14 may be a rigid elongate article, such as a rebar.

The connecting device 10 is suitable for use in agriculture, particularly in the growing of fruit trees and vines. However, it will be appreciated that the connecting device 10 can be used in any industry.

In circumstances where, for example, it is necessary to draw netting over trees or vines, flexible first elongate articles 12 extend between rows of the trees or vines, and over the tops of the trees or vines along the rows.

The first elongate articles 12 are joined to the second elongate articles 14 extending around the fields in which the vines or trees are grown. The netting is supported by the first and flexible second elongate articles 12, 14.

The connecting device 10 comprises a first securing arrangement in the form of a first clamping arrangement 16. The first clamping arrangement 16 clamps the flexible first elongate article 12. The connecting device 10 further includes a second securing arrangement in the form of a second clamping arrangement 18. The second clamping arrangement 18 clamps the flexible second elongate article 14.

The connecting device 10 comprises a body 20 in the form of a housing in which the first clamping arrangement 16 is housed. The body 20 has a forward region 20A and a rearward region 20B.

Figure 6:
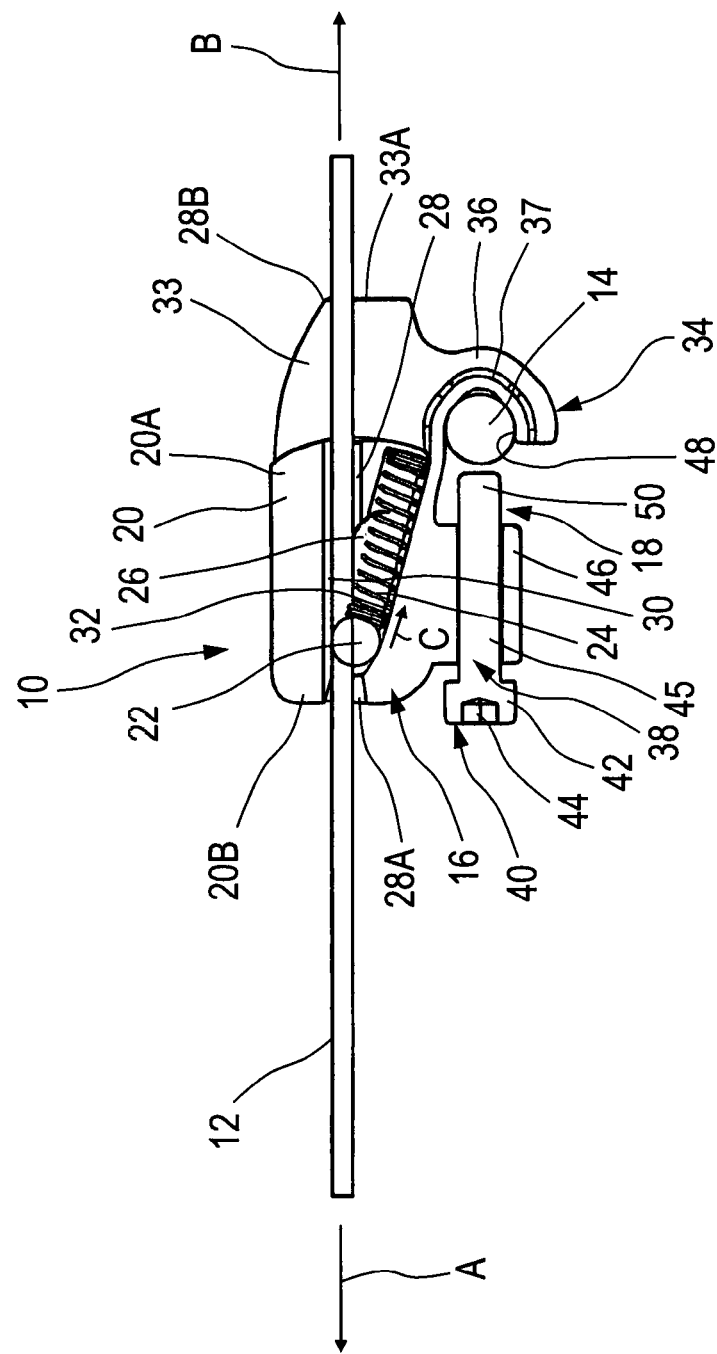
FIG. 6 is a sectional view of the connecting device along the lines VI-VI in FIG. 5.
Figure 7:
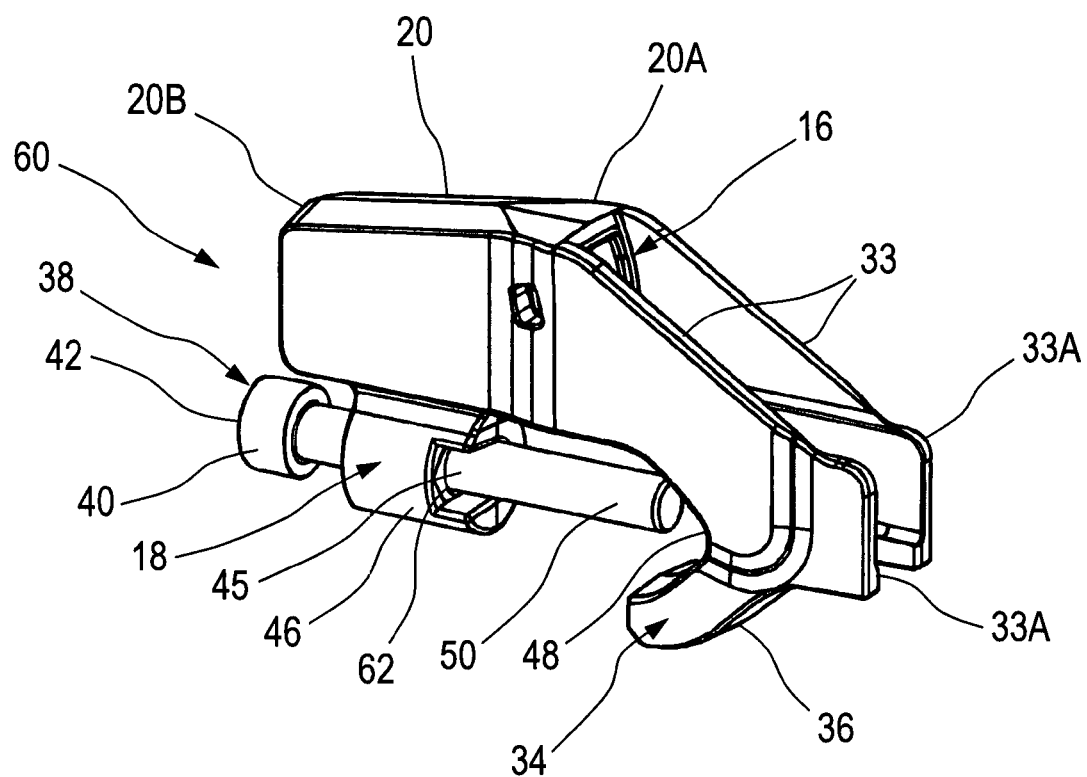
FIG. 7 is a perspective view from above of another connecting device.
Figure 8:
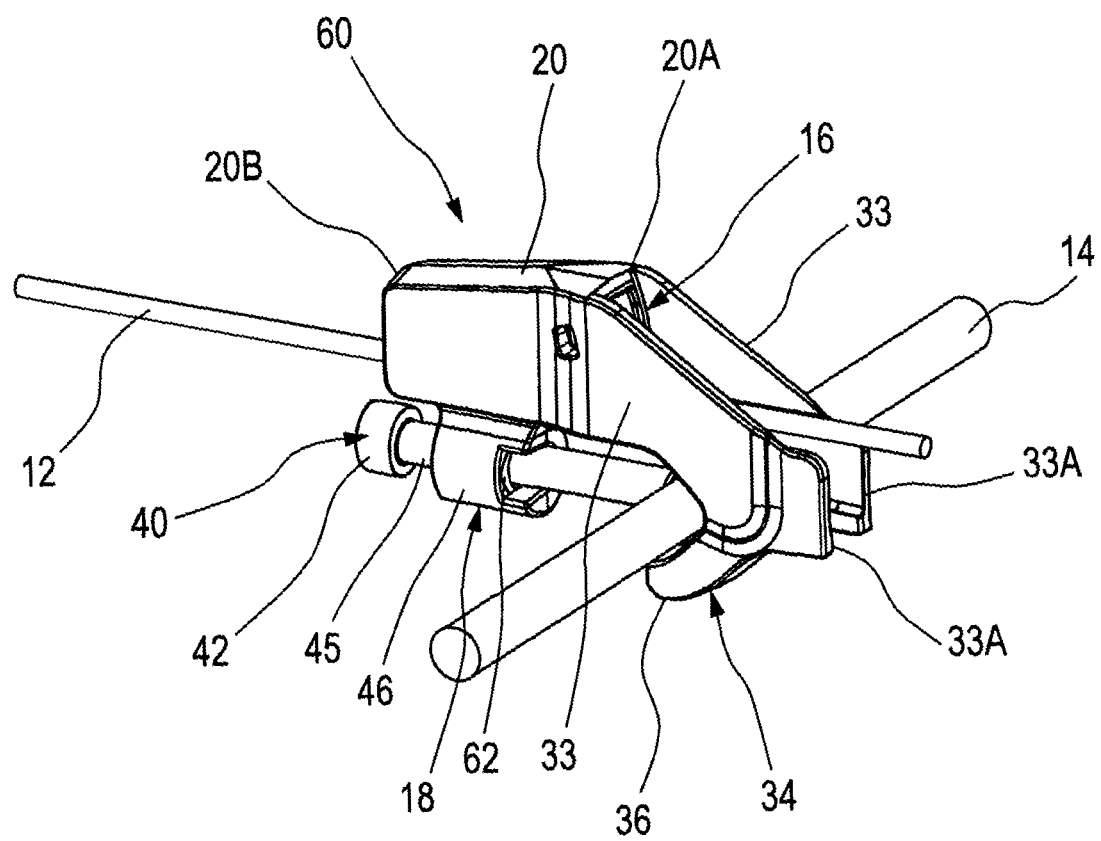
FIG. 8 is a perspective view from above of the connecting device shown in FIG. 7, with first and second elongate articles secured thereto.
Figure 9:
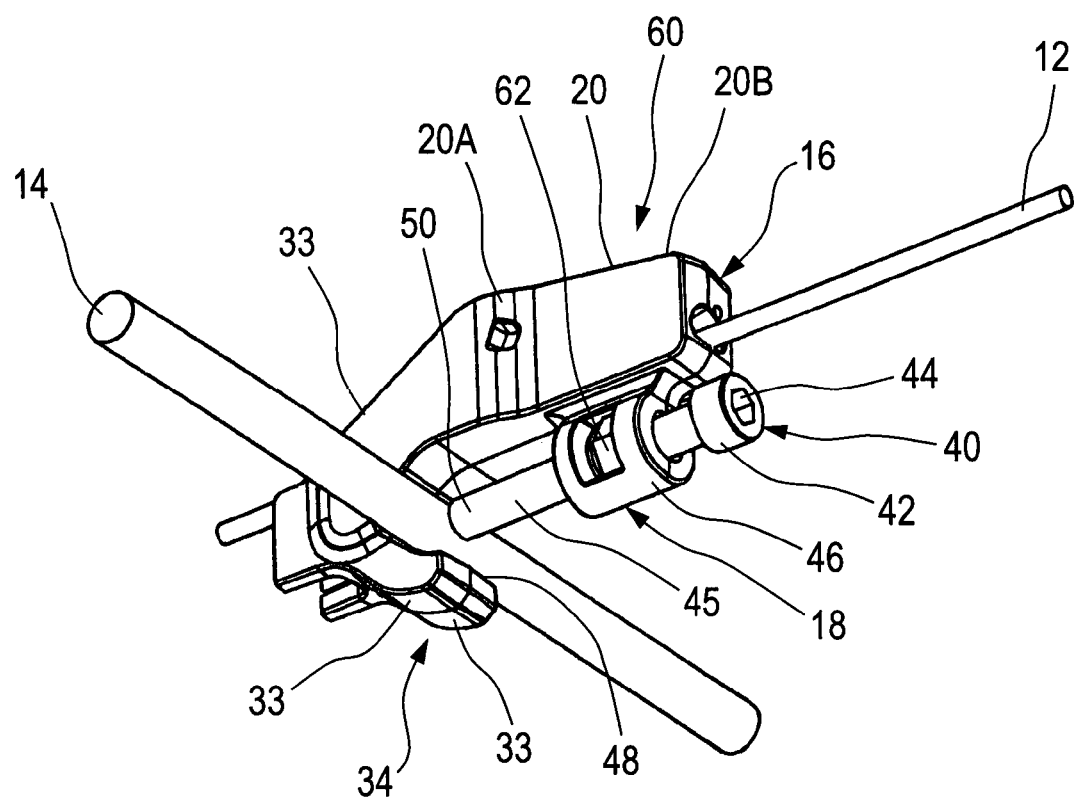
FIG. 9 is a perspective view from below of the connecting device shown in FIG. 7, with the first and second elongate articles secured thereto.
Figure 10:
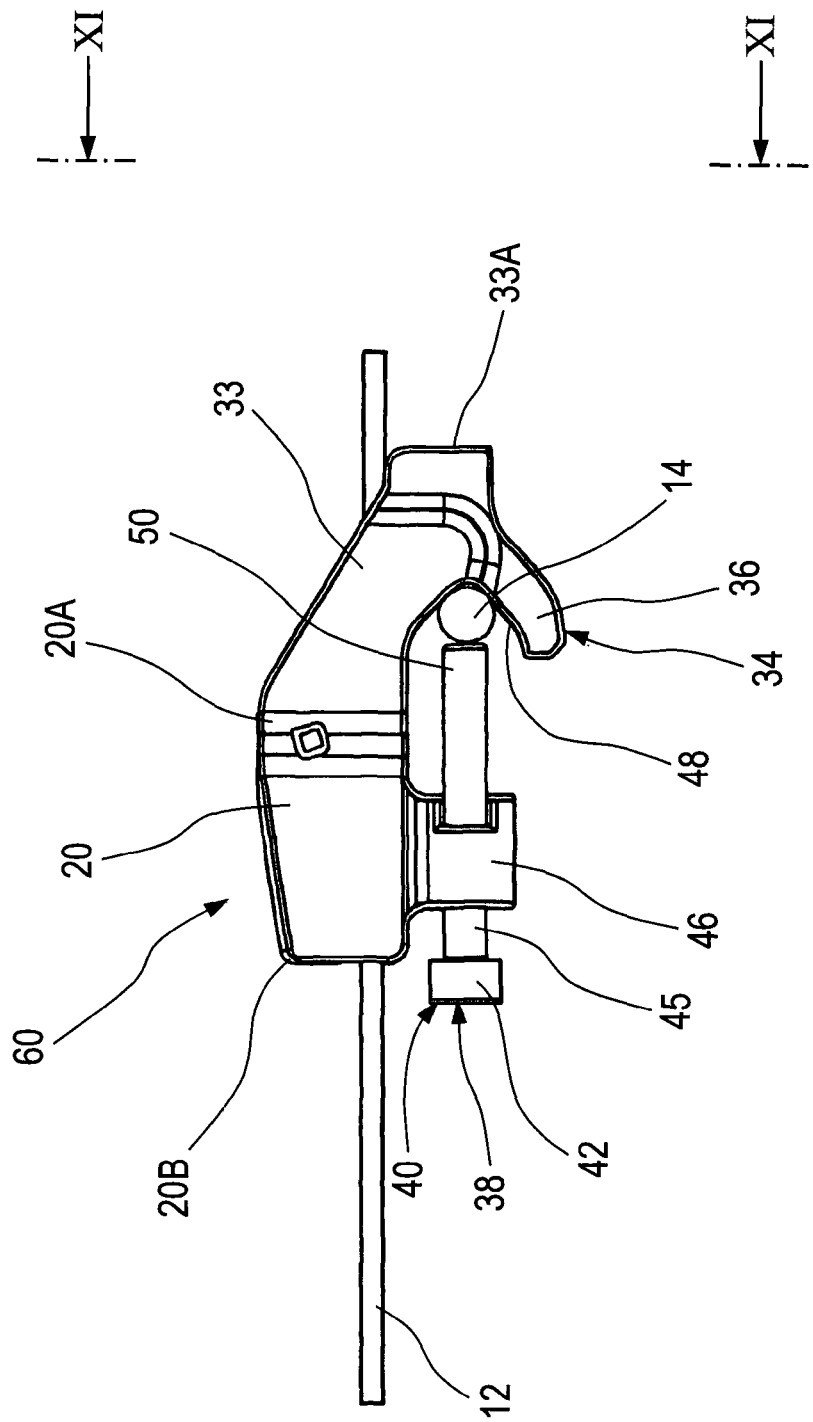
FIG. 10 is a side view of the connecting device shown in FIG. 7, with the first and second elongate articles secured thereto.
Figure 11:
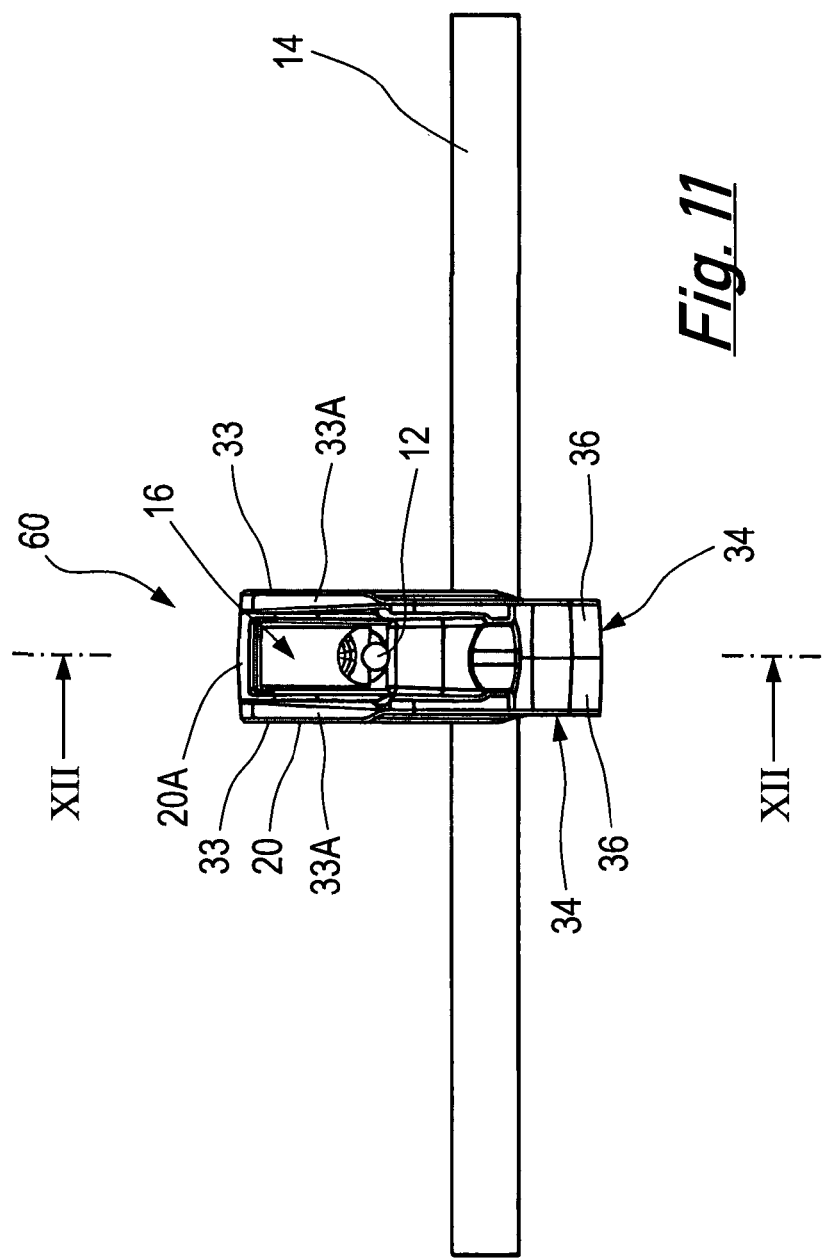
FIG. 11 is a view along the lines XI-XI in FIG. 10.

Referring to FIG. 6, the first clamping arrangement 16 comprises a clamping member 22 in the form of a wedge, roller or ball. The first clamping arrangement 16 further includes an urging member 24 in the form of a compression spring. If desired, the compression spring may have inwardly tapering opposite ends, each having a frustoconical configuration.

The body 20 defines an internal space 26 in which the urging member 24 is disposed.

The body 20 also defines a passage 28 for the first elongate article 12. The passage 28 has openings 28A and 28B at opposite ends of the body 20, and is configured to allow the first elongate article 12 to be threaded through the body 20 via the openings 28A, 28B. The space 26 is defined in the body 20 so that the urging member 24 urges the clamping member 22 towards the passage 28 to engage, and thereby clamp, the first elongate article 12.

The passage 28 has a clamping surface 30 provided by the body 20. The first elongate article 12 extends through the passage 28 along the clamping surface 30, in engagement with the clamping surface 30.

As shown in FIG. 6, the urging member 24 is arranged between the passage 28 and the second clamping arrangement 18. The urging member 24 extends, from the forward region 20A of the body 20, to the clamping member 22 at the rearward region 20B of the body 20.

The body 20 further provides a reaction surface 32 opposite the clamping surface 30. The reaction surface 32 is a surface defining the internal space 26, and extends obliquely to the clamping surface 30. The urging member 24 urges the clamping member 22 along the reaction surface 32.

The gap between the reaction surface 32 and the clamping surface 30 narrows in the direction in which the urging member 24 urges the clamping member 22. The first elongate article 12 is clamped by the clamping member 22 between the clamping and reaction surfaces 30, 32.

When the clamping member 22 is urged into engagement with the first elongate article 12, movement of the elongate article in a first direction, indicated by the arrow A in FIG. 6 pulls the clamping member 22 into the narrowing gap between the clamping and reaction surfaces 30, 32, thereby pulling the clamping member 22 into tighter engagement with the first elongate article 12.

A nose formation in the form of a pair of projections 33 extend from the forward region 20A of the body 20. The projections 33 are parallel to each other and include narrowed forward end portions 33A to cooperate with a tensioning tool to allow the tensioning tool to tension the first elongate article 12 within the first clamping arrangement 16.

The second clamping arrangement 18 comprises a receiving arrangement in the form of a hook formation 34 for receiving the second elongate article 14. The hook formation 34 comprises a pair of hook members 36 arranged side by side. Each hook member 36 is provided at the forward region 20A of the body 20, and extends from a respective one of the projections 33.

Both of the hook members 36 face in the same direction relative to the body 20, i.e. towards the rearward region 20B of the body 20. A web portion 37 extends between the hook members 36 to join the hook members 36 to each other.

The second clamping arrangement 18 further includes a movable member 38 in the form of a bolt. The movable member 38 has a proximal end region 40 comprising a head 42 comprising a drive formation 44 in the form of a hexagonal recess to cooperate with a driver in the form of a hex key (not shown).

The driver may be any other suitable driver known in the art, such as a screwdriver or spanner, and the head may be suitably configured in a manner which would be known to the person skilled in the art.

The movable member 38 further includes a threaded shaft 45. The second clamping arrangement 18 includes a holder 46 to hold the movable member 38. The holder 46 has threads that correspond with the threads on the shaft 45 of the moveable member 38, thereby allowing the movable member 38 to be screwed into the holder 46 in a direction towards the hook formation 34.

As shown in the drawings, each of the hook members 36 defines a gap 48 which faces the movable member 38. The second elongate article 14 is received by hook members 36 via the gaps 48.

The movable member 38 further includes a distal end region 50 for engaging the second elongate article 14. The distal end region 50 constitutes a clamping portion of the movable member 38, and clamps the second elongate article 14 against the hook formation 34 when the movable member 38 is screwed into the holder 46.

It is desirable that the tension on the first elongate article 12 does not cause the first elongate article 12 to be inadvertently released from the first clamping arrangement 16 when the second elongate article 14 is clamped by the second clamping arrangement 18. In order to prevent such inadvertent release, the clamping surface 30 and the reaction surface 32 taper towards each other in a direction away from the hook formation 34. In addition, the urging member 24 urges the clamping member 22 in a direction away from the hook formation 34.

In use, the first elongate article 12 first secured to the connecting device 10 as follows. The first elongate article 12 is threaded into the passage 28 in the direction indicated by the arrow B in FIG. 6.

The first elongate article 12 engages the clamping member 22 and pushes it against the urging of the urging member 24 along the reaction surface 32 in the direction indicated by the arrow C. This moves the clamping member 22 out of the way of the first elongate article 12, which can now be threaded into the passage 28 until a desired length has been threaded therethrough.

The first elongate article 12 is then pulled in the direction indicated by the arrow A in FIG. 6. This pulls the clamping member 22 along the reaction surface 32 in the direction opposite to the direction indicated by the arrow C, thereby pulling the clamping member 22 into the narrowing gap between the clamping surface 30 and the reaction surface 32. As a result, the first elongate article 12 is clamped by the clamping member 22 against the clamping surface 30, and held under tension by the connecting device 10 when the second elongate article 14 is clamped by the movable member 38 to the hook formation 34.

The second elongate article 14, which may have already been installed in its desired location, is secured to the connecting device 10 as follows. The hook formation 34 is arranged over the second elongate article 14 so that the second elongate article 14 is received in the hook members 36 via the gaps 48.

The movable member 38 is then screwed through the holder 46 until the distal end region 50 engages the second elongate article 14 in a region between the hook members 36. The movable member 38 is then tightened onto the second elongate article 14, pushing the second elongate article 14 into tight engagement with the hook formation 34. Thus, the second elongate article 14 is clamped to the connecting device 10.

The first and second elongate articles 12, 14 are connected to each other in respective orientations that are transverse relative to each other. In the embodiment shown, the first and second elongate articles 14 are connected to each other at approximately 90°.

There is thus described a connecting device 10 for connecting first and second elongate articles 14, such as wires or cables, to each other in orientations that are transverse to one another. The connecting device 10 is quick and simple to use and enables the first and second elongate articles 14 to be connected to each other securely and effectively.

Various modifications can be made without departing from the scope of the invention. For example, the pair of hook members 36 may be replaced by a single hook member extending across the body 20.

Another connecting device, generally designated 60, is shown in FIGS. 7 to 12. The connecting device 60 comprises the features of the connecting device 10, such features being designated with the same reference numerals in FIGS. 7 to 12 as in FIGS. 1 to 6.

Figure 12:
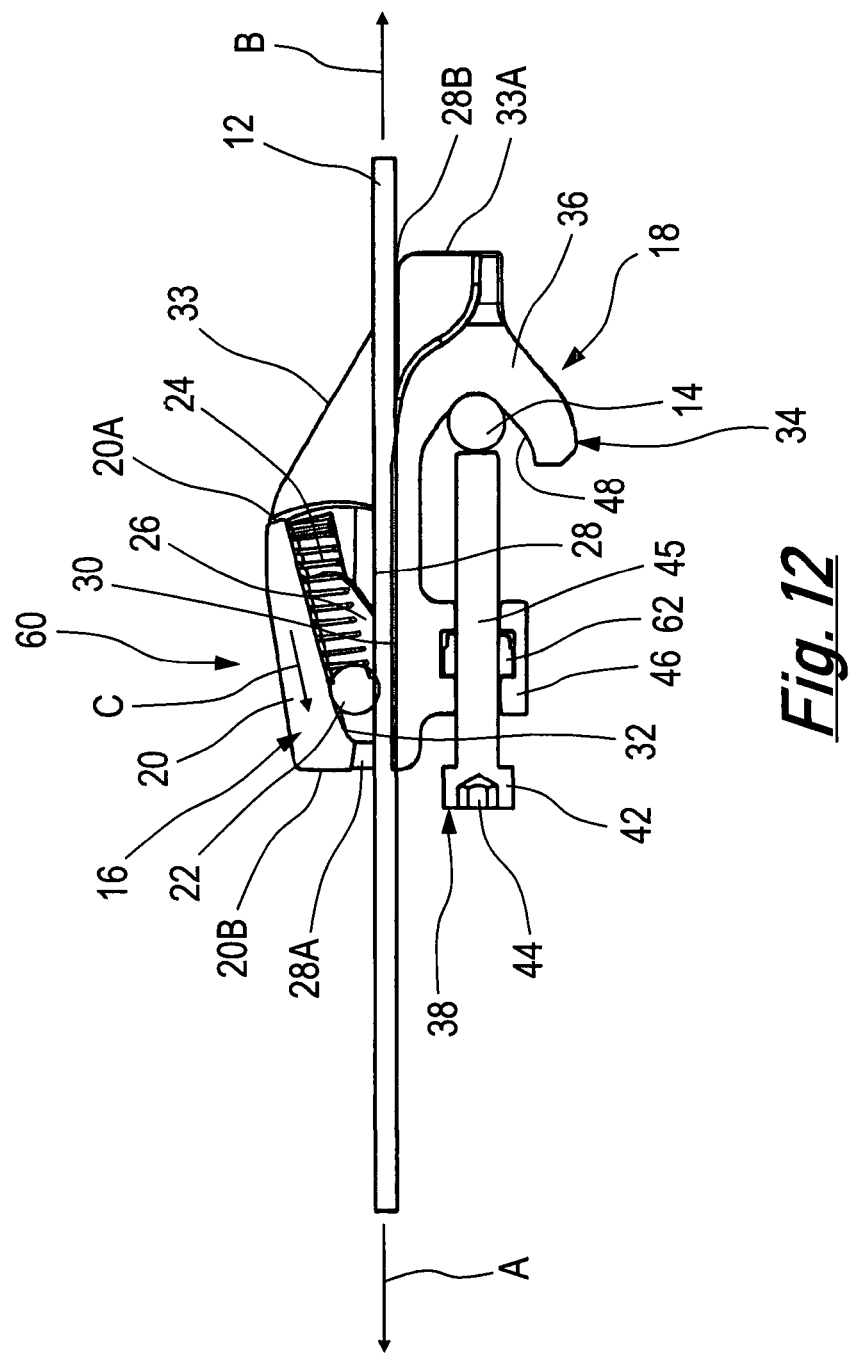
FIG. 12 is a sectional view of the connecting, device along the lines XII-XII in FIG. 11.

The first clamping arrangement 16 of the connecting device 60 is arranged so that the passage is between the urging member and the second clamping arrangement. As shown in FIG. 12, the passage 28 is arranged between urging member 24 and the second clamping arrangement 18. The urging member 24 extends, from the forward region 20A of the body 20, to the clamping member 22, at the rearward region 20B of the body 20.

In this arrangement, the passage 28 is closer to the second clamping arrangement 18, which, in the embodiment described, improves alignment of the first elongate 12 with the second elongate article 14, and helps prevent rotation of the body 20. Such rotation of the body 20 may occur when the distance between the first and second elongate articles 12, 14 is large.

The connecting device 60 shown in FIGS. 7 to 12 reduces loading on the body 20, thereby allowing the connecting device 60 to be lighter in weight, because less material is required. In addition, there is a reduction in the extent to which the body 20 tilts.

The hook members 36 are arranged alongside each other, and extend contiguously adjacent each other; no web portion 37 is required in the connecting device 60 shown in FIGS. 7 to 12.

The projections 33A of the connecting device 60 are longer than the projections 33A of the connecting device 10, thereby improving interaction with the tensioning tool (not shown).

The connecting device 60 includes a captive fastening member in the form of a threaded nut held by the body 20. In the connecting device 60, the threaded nut receives the movable member 38 therethrough. Thus, when the movable member 38 is received by the threaded nut, the movable member 38 is held by the holder 46.

There is thus described connecting devices 10, 60 which reduce the time and difficulty associated with twisting and tying steel wire, thereby reducing the risk of hand injuries and allowing for a consistent and high quality tensioned join. When compared to alternatives such as combinations of U-bolts, turn buckles, thimbles, or ratchet strainers the connecting devices 10, 60 are faster and less expensive to install (saving on labour costs), lighter and smaller to transport (saving on transportation costs) and easier to install as a single component system that joins and tensions in one. The connecting devices 10, 60 can be used with second elongate articles 14 of different sizes and diameters.

The invention claimed is:

1. A connecting device comprising:
a body having a forward region and a rearward region;
a first clamping arrangement comprising a passage for a first elongate article, the passage being defined by the body, and the first clamping arrangement including a clamping member and a spring, the clamping member configured to clamp the first elongate article in the passage, and the spring configured to urge the clamping member towards the passage in a direction away from the forward region of the body into clamping engagement with the first elongate article;
wherein the first clamping arrangement is positioned to secure the first elongate article to the connecting device in a first orientation of the first elongate article;
a second clamping arrangement including a hook formation configured to receive the second elongate article, the hook formation being at the forward region of the body;
wherein the second clamping arrangement is positioned to secure the second elongate article to the connecting device in a second orientation, the second orientation being transverse to the first orientation.

2. A connecting device according to claim 1, wherein the connecting device includes a nose formation extending from the forward region of the body.

3. A connecting device according to claim 1, wherein the body defines an internal space in which the urging member is disposed, the internal space communicating with the passage to allow the urging member to urge the clamping member towards the passage.

4. A connecting device according to claim 1, wherein the hook formation comprises either:
a pair of hook members arranged side by side, each of the hook members having an opening facing the rearward region of the body; or
a single hook member, the hook member having an opening facing the rearward region of the body.

5. A connecting device according to claim 1, wherein either:
the body includes cooperating formations which cooperate with the cooperating portion of the movable member, thereby effecting the aforesaid movement of the movable member; or the second securing arrangement includes a discrete fastening member held by the body, the fastening member comprising formations which cooperate with the cooperating portion to effect the aforesaid movement.

6. A method of using a connecting device as claimed in claim 1, said method comprising securing the first elongate article to the connecting device by means of the first clamping arrangement, securing the second elongate article to the connecting device by means of the second clamping arrangement.

7. A method according to claim 6, wherein the step of securing the first elongate article to the first clamping arrangement comprises moving the first elongate article through the passage in one direction to move the clamping member away from the passage, and thereafter comprises moving the first elongate article in an opposite direction to cause the clamping member to clamp the first elongate article.

8. A method according to claim 7, wherein the first clamping arrangement includes a clamping surface for engaging the first elongate article, and the first clamping arrangement further includes a reaction surface to provide a reaction force on the clamping member, and wherein the step of clamping the first elongate article comprises arranging the first elongate article and the clamping member between the clamping surface and the reaction surface.

9. A method according to claim 6, wherein the step of securing the first elongate article to the first securing arrangement comprises holding the first elongate article under tension when the second elongate article is secured to the second securing arrangement.

10. A method according to claim 6, wherein the hook formation is configured to extend around the second elongate article, and wherein the step of securing the second elongate article to the second securing arrangement comprises arranging the second elongate article in the hook formation.

11. A method according to claim 6, wherein the second securing arrangement comprises a movable member, the movable member including a clamping portion for clamping the second elongate article, and wherein the step of securing the second elongate article to the second securing arrangement comprises moving the movable member to clamp the second elongate article with the clamping portion.

* * * * *